US009301112B2

(12) United States Patent
Morris et al.

(10) Patent No.: US 9,301,112 B2
(45) Date of Patent: Mar. 29, 2016

(54) URGENT CALL-BACK FEATURE THAT LOCKS-OUT NON-URGENT CALLS

(71) Applicant: International Business Machines Corporation, Armonk, NY (US)

(72) Inventors: John C. Morris, Wake Forest, NC (US); Margaret M. Quinn, Cary, NC (US); Edward S. Suffern, Chapel Hill, NC (US); Laura A. Weaver, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 121 days.

(21) Appl. No.: 13/965,263

(22) Filed: Aug. 13, 2013

(65) Prior Publication Data

US 2015/0050905 A1    Feb. 19, 2015

(51) Int. Cl.
*H04W 4/16* (2009.01)
*H04M 1/663* (2006.01)
*H04M 1/57* (2006.01)

(52) U.S. Cl.
CPC ........ *H04W 4/16* (2013.01); *H04M 1/57* (2013.01); *H04M 1/663* (2013.01)

(58) Field of Classification Search
CPC ...................................................... H04M 1/663
USPC ........................................... 455/404.1, 414.1
See application file for complete search history.

(56) References Cited

U.S. PATENT DOCUMENTS

| 6,418,211 | B1 * | 7/2002 | Irvin ............................ 379/188 |
| 6,650,746 | B1 | 11/2003 | Groen et al. |
| 7,333,496 | B1 * | 2/2008 | Patel et al. ............... 370/395.42 |
| 7,454,009 | B2 | 11/2008 | Aupperie et al. |
| 7,664,237 | B1 | 2/2010 | Croak et al. |
| 7,720,213 | B2 | 5/2010 | Desai et al. |
| 8,139,745 | B2 | 3/2012 | Alston et al. |
| 8,229,404 | B2 * | 7/2012 | Sweeney et al. ........... 455/414.1 |
| 8,355,491 | B1 * | 1/2013 | Butt ........................ 379/210.02 |
| 8,532,627 | B1 * | 9/2013 | Nassimi .................. H04W 4/22 455/466 |
| 2002/0067806 | A1 | 6/2002 | Rodriguez et al. |
| 2004/0032946 | A1 | 2/2004 | Koser et al. |
| 2004/0132438 | A1 * | 7/2004 | White ........................... 455/418 |
| 2006/0194574 | A1 * | 8/2006 | Azimi et al. .................. 455/415 |
| 2007/0161412 | A1 | 7/2007 | Nevid et al. |
| 2009/0311999 | A1 | 12/2009 | Sarkar et al. |
| 2012/0219141 | A1 | 8/2012 | Gonzalez et al. |

FOREIGN PATENT DOCUMENTS

| EP | 1677499 A1 | 7/2006 |
| WO | WO2006026622 A2 | 3/2006 |
| WO | WO2007109342 A2 | 9/2007 |

\* cited by examiner

*Primary Examiner* — Lester Kincaid
*Assistant Examiner* — Daniel G Bassett
(74) *Attorney, Agent, or Firm* — Katherine S. Brown; Jeffrey L. Streets (57) ABSTRACT

A computer program product includes computer readable program code embodied on a computer readable storage medium. The computer program product include computer readable program code for receiving input from a user of a first communication device identifying a second communication device and initiating a call to the second communication device, computer readable program code for receiving further input from the user of the first communication device indicating that an incoming call from the identified second communication device is an urgent call, and computer readable program code for, in response to receiving the further input from the user of the first communication device, blocking any incoming call that is not identified as an urgent call.

18 Claims, 4 Drawing Sheets

URGENT CALL-BACK FEATURE THAT LOCKS-OUT NON-URGENT CALLS

BACKGROUND

1. Field of the Invention

The present invention relates to communication devices and systems, such as telephones and communication networks.

2. Background of the Related Art

Communication devices, such as telephones, are an integral part of everyday life in a modern society. Telephones that are connected to a land line are even on the decline, as people become accustomed to having a mobile phone with them at all times. The functions and features available on a telephone continues to expand, including apps, browsers, a camera, full physical or virtual keypads, touchscreens, wifi and Bluetooth connectivity, texting and email, and more.

When a first communication device is used to place a call to a second communication device, a telephone number or other identification associated with the second communication is entered using a keypad or voice command of the first communication device, or is identified from a list of contacts stored within the first communication device. Once the call has been initiated, the second communication device will typically produce an audible ring tone or vibrate in order to notify a called party of the call. However, due to the wide range of tasks that a user may perform on their telephone, the increasing mobility and usability of telephones, and the resulting amount of time that a user spends on their telephone, it is increasingly common that a call will not be answered promptly. After a few rings, a call will typically roll to voicemail or simply be logged as a missed call.

While voicemail is helpful for dealing with missed calls, a voice message in inherently a one-way communication from the calling party to the called party. Accordingly, voicemail frequently does not satisfy the calling party's need to talk with the called party. For example, in an urgent situation, a calling party may need to obtain information or assistance from the called party. If a first called party fails to answer, then the calling party may place additional calls to other contacts in the hope of getting the needed information or assistance. Furthermore, the calling party may also be receiving telephone calls from other telephone users. If the calling party is not careful, it is possible to miss an incoming (return) call from the called party even though talking to the called party is their top priority.

BRIEF SUMMARY

Another embodiment of the present invention provides a computer program product including computer readable program code embodied on a computer readable storage medium. The computer program product includes computer readable program code for receiving input from a user of a first communication device identifying a second communication device and initiating a call to the second communication device; computer readable program code for receiving further input from the user of the first communication device indicating that an incoming call from the identified second communication device is an urgent call; and computer readable program code for, in response to receiving the further input from the user of the first communication device, blocking any incoming call that is not identified as an urgent call.

DETAILED DESCRIPTION

One embodiment of the present invention provides a method comprising: receiving input from a user of a first communication device identifying a second communication device and initiating a call to the second communication device; receiving further input from the user of the first communication device indicating that any prospective incoming call from the identified second communication device is an urgent call; and, in response to receiving the further input from the user of the first communication device, blocking any incoming call that is not identified as an urgent call.

A user may provide input to a communication device in an expanding variety of ways. Such input may include, without limitation, the use of a physical keypad, a virtual keypad or other touchscreen gesture, or a voice command. Furthermore, the type or means of input may the same or different when identifying the second communication device, initiating a call to the second communication device, and indicating that an incoming call from the identified second communication device is an urgent call. In a specific non-limiting example, a user might identify the second communication device and initiate a call to the second communication device using a voice command, such as "Call Adam." If Adam fails to answer, then the user might indicate that an incoming call from Adam (i.e., the identified second communication device) is an urgent call by entering a code into a keypad.

In a further example, the further input, which identifies a communication device associated with an urgent call, is an alert code input into a keypad of the first communication device after initiating the call to the second communication device and prior to the first communication device initiating a subsequent call to another communication device. By providing the alert code input after initiating the urgent call and prior to a subsequent call, it is not necessary to separately input the identification of a communication device to be identified with the urgent call.

In a further embodiment, the identification of a communication device associated with an urgent call may be automatically expanded to include one or more other correlated identifications. For example, a user may maintain a list of contacts (contact records) that stores various information for each contact (i.e., person, business, group, etc.). As a specific example, a single contact record for a doctor might include the doctor's office phone number, the doctor's home phone number, and the doctor's mobile phone number. Each of these three phone numbers are "correlated" by being stored in a single contact record. This embodiment recognizes that the doctor may receive a voice message, text message or missed call message on the doctor's mobile phone, yet choose to return the call from the doctor's office phone. A return call from any of these correlated phone numbers should be treated as urgent and not be blocked.

Still further, where the original identification of a communication device associated with an urgent call, or one of the correlated identifications, is a business phone number, the calling party's communication device will identify any phone number from that same business as being an urgent call such that the call will not be blocked. This latter feature may be beneficial since an outgoing (return) call from a business with multiple phone lines may not be the same as business' main phone number. Accordingly, the called party's communication device may look for matching text in the caller ID of an incoming call for the purpose of determining whether the call is from the called party. In the absence of text in the caller ID or known alternative business numbers, the calling party's communication device might determine an incoming call as being an urgent return call if the incoming identification (phone number) is within a range of the business' main number, which is presumably stored in the calling party's contact record that include the originally called identification or phone number.

In accordance with the present invention, once the user has indicated that any prospective incoming call from one or more communication device is an urgent call, then the first (calling party) communication device automatically blocks any incoming call that the user has not identified as an urgent call. Preferably, the first communication device will not generate a ring tone for incoming calls that have been blocked. Optionally, a busy signal may be provided in response to any incoming calls that have been blocked. In a further option, a log of incoming calls that have been blocked is maintained and accessible to the first communication device.

In a further embodiment, the method may, in response to receiving the further input from the first user, automatically assign an urgent ring tone to be used in the event of the first communication device receiving an incoming call identified as an urgent call, wherein the urgent ring tone is different than other ring tones used by the first communication device. The use of an urgent ring tone may assist the user in recognizing the importance of the incoming call, despite the fact that the user has blocked any incoming calls that are not urgent.

In another embodiment, the method may, in response to the second communication device not answering the call, prompt the user of the first communication device for input indicating whether any prospective incoming call from the identified second communication device should be identified as urgent or not urgent. Such a prompt may be a display message with a virtual button for indicating whether a return call is urgent or not urgent. Alternatively, the prompt may be an audible message asking the user to indicate whether a return call is urgent or not urgent.

In yet another embodiment, the method may, in response to the first user using the first communication device to leave a message for the second communication device, prompt the user for input indicating whether any prospective incoming call from the identified second communication device should be identified as urgent or not urgent.

Still further, after receiving further input from the user of the first communication device indicating that any prospective incoming call from the identified second communication device is an urgent call, the method may store an identification of the second communication device in an urgent call list. At any point in time, the urgent call list may include any number of communication device identifications, such as telephone numbers or indexes into a contacts list. A timeout period, described below, may be separately associated with each identification or a single timeout period may be used for the entire urgent call list. A single timeout period might be started upon entry of a first identification into the urgent call list or the single timeout period might be re-starting after the addition of each identification to the urgent call list.

In a further option, the method may, after expiration of a timeout period since the first communication device received the further input (from the user of the first communication device indicating that any prospective incoming call from the identified second communication device is an urgent call), automatically indicate that an incoming call from the second communication device is not urgent. This automatic timeout feature is beneficial for preventing the first communication device from indefinitely blocking calls that are not identified as being urgent calls, or requiring the user to remember to remove identifications from the urgent call list.

Another embodiment of the present invention provides a computer program product including computer readable program code embodied on a computer readable storage medium. The computer program product includes computer readable program code for receiving input from a user of a first communication device identifying a second communication device and initiating a call to the second communication device; computer readable program code for receiving further input from the user of the first communication device indicating that any prospective incoming call from the identified second communication device is an urgent call; and computer readable program code for, in response to receiving the further input from the user of the first communication device, blocking any incoming call that is not identified as an urgent call.

The foregoing computer program product may further include computer readable program code for implementing or initiating any one or more aspects or embodiments of the methods described herein. Accordingly, a separate description of the methods will not be duplicated in the context of a computer program product.

Figure 1:
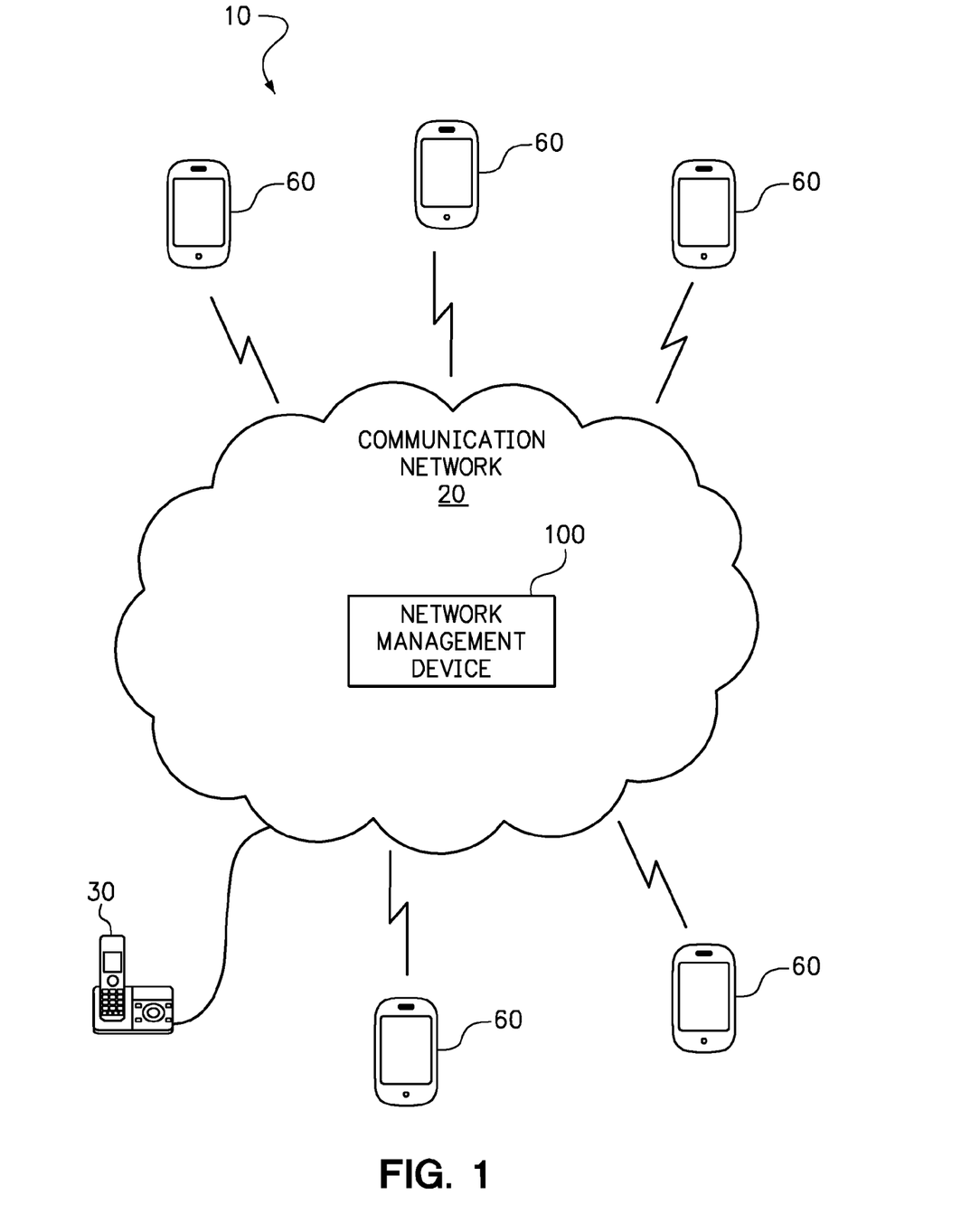
FIG. 1 is a diagram of a communication network enabling communication between a plurality of communication devices.

FIG. 1 is a diagram of a system 10 including a communication network 20 enabling communication between a plurality of communication devices, such as a telephone 30 coupled to a land line and mobile telephones 60. The communication network 20 may be managed by a network management device 100. The network management device 100 may be responsible for establishing connections between communications devices, and may also provide one or more services to the communications devices. For example, although the methods of the invention may be implemented entirely within one of the communication devices 30, 60, it is also possible to implement one or more steps of the methods of the invention in the network management device 100. In one non-limiting example, the network management device 100 may store the urgent call list for each communication device 30, 60, block incoming calls from communication devices that are not identified on the urgent call list, and maintain a log of incoming calls that have been blocked.

Figure 2:
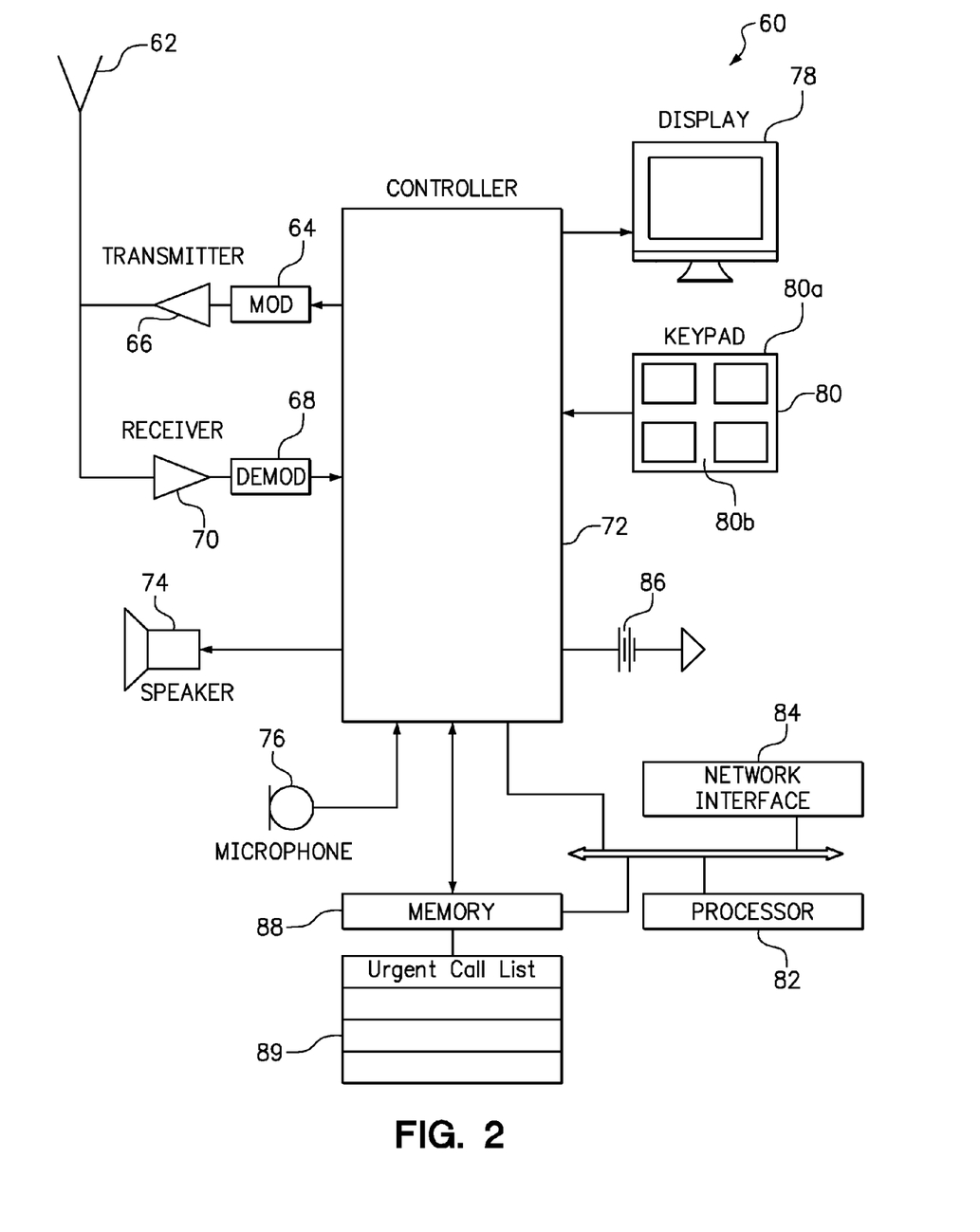
FIG. 2 is a diagram of a mobile communication device consistent with embodiments of the invention.

FIG. 2 is a diagram of a mobile communication device capable of communicating with other communications devices and implementing embodiments of the present invention. However, this mobile communication device is a non-limiting example and alternative structures may be similarly able of implementing embodiment of the present invention. The mobile telephone or wireless mobile device 60 includes an antenna 62 for transmitting signals to and from a mobile telephone network, which is part of the communications network 100 (See FIG. 1). The wireless mobile device 60 includes a modulator 64, a transmitter 66, a demodulator 68, a receiver 70, and a controller 72 that provides signals to the transmitter and receives signals from the receiver. These signals include audio and/or computer readable data. The controller 72 may also be connected to a conventional speaker 74, microphone 76, display 78, and input device, typically a keypad 80. The keypad includes keys 80a, which are numeric and alphanumeric keys typically found on a telephone, and other keys 80b, used for operating the mobile telephone including, but not limited to, a power key, a SEND key, and various menu scrolling and other keys. The device 60 may further include a processor 82 and a network interface 84, and a battery power source 86.

The mobile telephone 60 also includes memory 88. In various embodiments, the memory 88 may stores the urgent call list 89 and, perhaps, a contacts list including contact names and telephone numbers. The contacts list may be searched and a telephone number selected, and then automatically dialed by the mobile telephone system. The telephone operating system contains the programmed instructions to operate the telephone and the telephone's features, such as the electronic telephone directory, the directory's search and automatic dialing functions, and the methods of the present invention for handling urgent calls.

Figure 3:
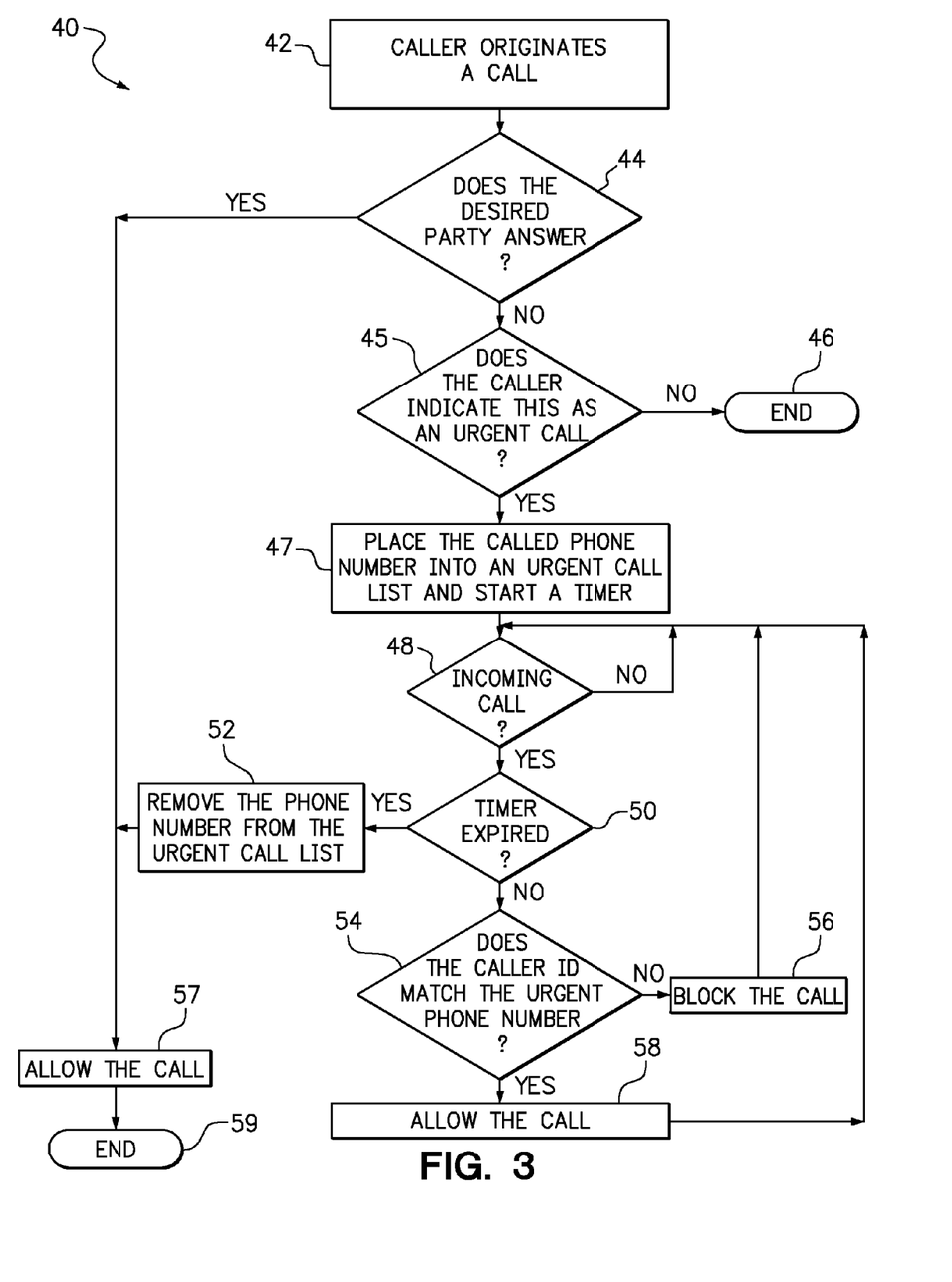
FIG. 3 is a flowchart of a method according to one embodiment of the invention.

FIG. 3 is a flowchart of a method 40 according to one embodiment of the invention. In step 42, a caller ("calling party") originates a call to a desired party ("called party"). If it is determined, in step 44, that the desired party answers the call, then the call is allowed in step 58 and the method ends. However, if it is determined, in step 44, that the desired party does not answer the call, then the method proceeds to step 45.

If it is determined, in step 45, that the caller does not want to designate this as an urgent call, then the method ends in step 46. However, if it is determined, in step 45, that the caller indicates this as an urgent call, then step 47 places the called phone number into an urgent call list and starts a timer. Step 48 determines whether there is an incoming call.

Once there is an incoming call, step 50 determines whether the timer has expired. If it is determined, in step 50, that the timer has expired, then step 52 removes the phone number from the urgent call list before allowing the call in step 57. After allowing the call in step 57, the method ends in step 59. However, if it is determined, in step 50, that the timer has not expired, then step 54 determines whether the caller ID from the incoming call matches the phone number in the urgent call list. If it is determined, in step 54, that the incoming call is on the urgent call list, then the call is allowed in step 58 and the method returns to step 48 in order to monitor for other incoming calls. However, if it is determined, in step 54, that the incoming call is not on the urgent call list, then the call is blocked in step 56. After blocking the incoming call in step 56, the method returns to step 48 in order to monitor for other incoming calls and handle them in the same manner described above.

Figure 4:
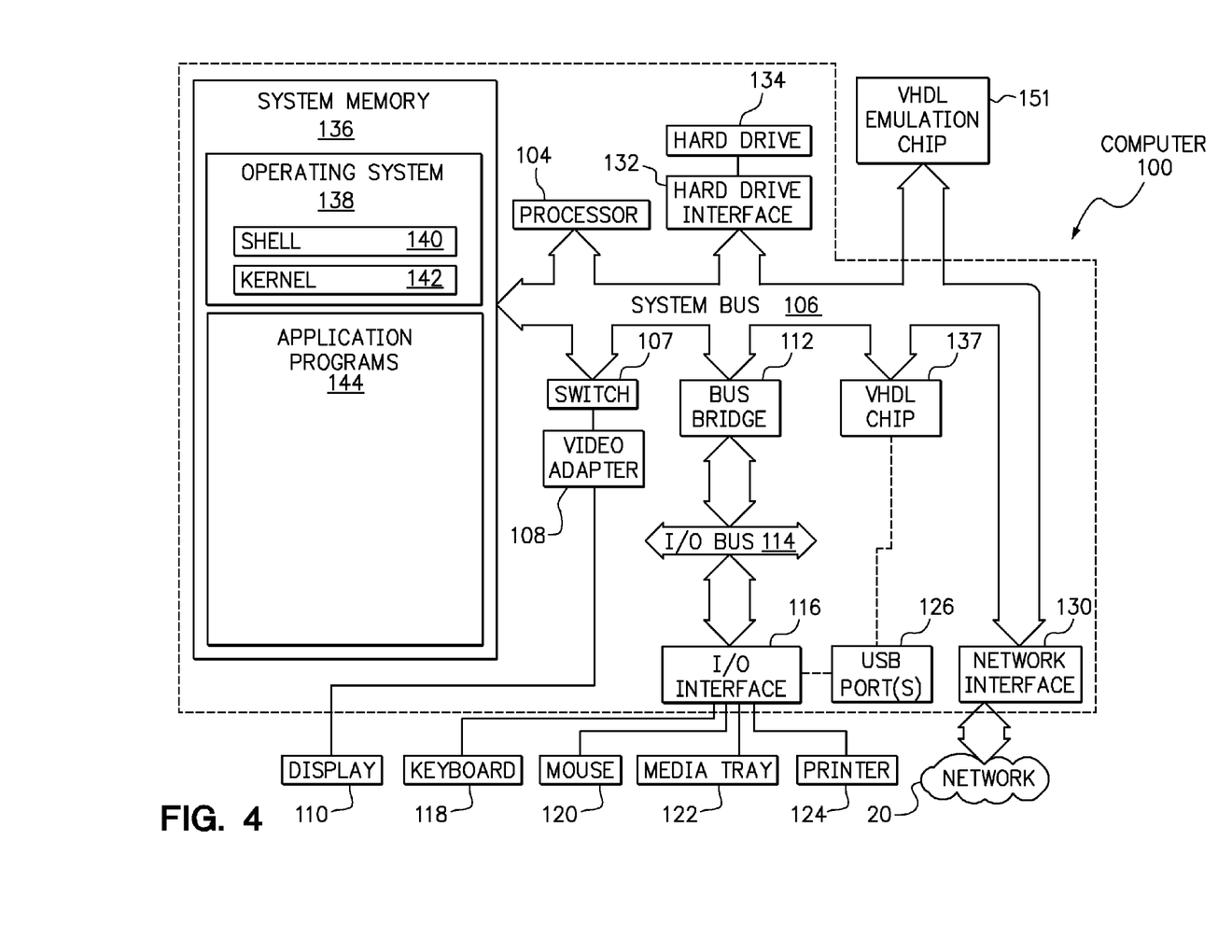
FIG. 4 is a diagram of a network management computer consistent with some embodiments of the invention.

FIG. 4 is a diagram of an exemplary computing node (or simply "computer") 100 that may be utilized as the network management device consistent with some embodiments of the present invention. Note that some or all of the exemplary architecture, including both depicted hardware and software, shown for and within computer 100 may be implemented in the network management device 100 as shown in FIG. 1.

Computer 100 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions that support the processes described herein.

The system bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, the computer 100 is able to communicate over a network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes computer 100's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management. Application programs 144 in the system memory of computer 100 may include various programs and modules for implementing the methods described herein.

Also stored in the system memory 136 is a VHDL (VHSIC hardware description language) program. VHDL is an exemplary design-entry language for field programmable gate arrays (FPGAs), application specific integrated circuits (ASICs), and other similar electronic devices. In one embodiment, execution of instructions from a VMPP causes the VHDL program to configure the VHDL chip 137, which may be an FPGA, ASIC, or the like.

In another embodiment of the present invention, execution of instructions from VMPP results in a utilization of a VHDL program to program a VHDL emulation chip 151. VHDL emulation chip 151 may incorporate a similar architecture as described above for VHDL chip 137. Once the VMPP and VHDL programs have programmed the VHDL emulation chip 151, the VHDL emulation chip 151 may perform, as hardware, some or all functions described by one or more executions of some or all of the instructions found in the VMPP. That is, the VHDL emulation chip 151 is a hardware emulation of some or all of the software instructions found in the VMPP. In one embodiment, VHDL emulation chip 151 is a programmable read only memory (PROM) that, once burned in accordance with instructions from the VMPP and VHDL program, is permanently transformed into a new circuitry that performs the functions needed to perform the processes of the present invention.

The hardware elements depicted in computer 100 are not intended to be exhaustive, but rather are representative components suitable to perform the processes of the present invention. For instance, computer 100 may include alternate memory storage devices such as magnetic cassettes, digital versatile disks (DVDs), Bernoulli cartridges, and the like. These and other variations are intended to be within the spirit and scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer readable program code embodied on a non-transitory computer readable storage medium, the computer program product including:
    computer readable program code for receiving input from a user of a first communication device identifying a second communication device and initiating a call to the second communication device;
    computer readable program code for, in response to the second communication device not answering the call, prompting the user of the first communication device for further input indicating whether an incoming call from the identified second communication device should be identified as urgent or not urgent;
    computer readable program code for receiving the further input from the user of the first communication device indicating that an incoming call from the identified second communication device is an urgent call; and
    computer readable program code for, in response to receiving the further input from the user of the first communication device, blocking any incoming call that is not identified as an urgent call.

2. The computer program product of claim 1, further comprising:
    computer readable program code for maintaining a log of incoming calls that have been blocked.

3. The computer program product of claim 1, further comprising:
    computer readable program code for preventing the first communication device from generating a ring tone for incoming calls that have been blocked.

4. The computer program product of claim 1, further comprising:
    computer readable program code for automatically indicating that an incoming call from any communication device having an identification correlated with the identification of the identified second communication device is an urgent call.

5. The computer program product of claim 1, further comprising:
    computer readable program code for, in response to receiving the further input from the first user, automatically assigning an urgent ring tone to be used in the event of the first communication device receiving an incoming call identified as an urgent call, wherein the urgent ring tone is different than other ring tones used by the first communication device.

6. The computer program product of claim 1, further comprising:
    computer readable program code for, in response to the first user using the first communication device to leave a message for the second communication device, prompting the user of the first communication device for further input indicating whether an incoming call from the identified second communication device should be identified as urgent or not urgent.

7. The computer program product of claim 1, further comprising:
    computer readable program code for storing an identification of the second communication device in an urgent call list.

8. The computer program product of claim 1, further comprising:
    computer readable program code for, after expiration of a timeout period since the first communication device received the further input, automatically indicating that an incoming call from the second communication device is not urgent.

9. The computer program product of claim 1, wherein the further input is an alert code input into a keypad of the first communication device after initiating the call to the second communication device and prior to the first communication device initiating a subsequent call to another communication device.

10. A method, comprising:
    receiving input from a user of a first communication device identifying a second communication device and initiating a call to the second communication device;
    in response to the second communication device not answering the call, prompting the user of the first communication device for further input indicating whether an incoming call from the identified second communication device should be identified as urgent or not urgent;
    receiving the further input from the user of the first communication device indicating that an incoming call from the identified second communication device is an urgent call; and
    in response to receiving the further input from the user of the first communication device, blocking any incoming call that is not identified as an urgent call.

11. The method of claim 10, further comprising:
maintaining a log of incoming calls that have been blocked.

12. The method of claim 10, further comprising:
preventing the first communication device from generating a ring tone for incoming calls that have been blocked.

13. The method of claim 10, further comprising:
automatically indicating that an incoming call from any communication device having an identification correlated with the identification of the identified second communication device is an urgent call.

14. The method of claim 10, further comprising:
in response to receiving the further input from the first user, automatically assigning an urgent ring tone to be used in the event of the first communication device receiving an incoming call identified as an urgent call, wherein the urgent ring tone is different than other ring tones used by the first communication device.

15. The method of claim 10, further comprising:
in response to the first user using the first communication device to leave a message for the second communication device, prompting the user for further input indicating whether an incoming call from the identified second communication device should be identified as urgent or not urgent.

16. The method of claim 10, further comprising:
storing an identification of the second communication device in an urgent call list.

17. The method of claim 10, further comprising:
after expiration of a timeout period since the first communication device received the further input, automatically indicating that an incoming call from the second communication device is not urgent.

18. The method of claim 10, wherein the further input is an alert code input into a keypad of the first communication device after initiating the call to the second communication device and prior to the first communication device initiating a subsequent call to another communication device.

* * * * *